US012671830B2

(12) United States Patent
Chen et al.

(10) Patent No.: US 12,671,830 B2
(45) Date of Patent: Jun. 30, 2026

(54) INTER PREDICTION IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Ning Yan, San Diego, CA (US); Xiaoyu Xiu, San Diego, CA (US); Che-Wei Kuo, San Diego, CA (US); Hong-Jheng Jhu, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/885,607

(22) Filed: Sep. 14, 2024

(65) Prior Publication Data

US 2025/0008141 A1     Jan. 2, 2025

Related U.S. Application Data

(63) Continuation of application No. PCT/US2023/015232, filed on Mar. 14, 2023.

(Continued)

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/172* (2014.11); *H04N 19/176* (2014.11)

(58) Field of Classification Search
CPC .. H04N 19/105; H04N 19/147; H04N 19/159; H04N 19/172; H04N 19/176;
(Continued)

(56) References Cited

U.S. PATENT DOCUMENTS 11,470,304 B2 * 10/2022 Zhang ................... H04N 19/176
2014/0198181 A1 * 7/2014 Chen ..................... H04N 19/573
                                                                348/43

(Continued)

FOREIGN PATENT DOCUMENTS

JP      2019535192 A  * 12/2019  ............. H04N 19/52
WO      2021129685 A1    7/2021

OTHER PUBLICATIONS

International Search Report issued in PCT application No. PCT/US2023/015232 dated Jul. 4, 2023, (3p).

(Continued)

*Primary Examiner* — Behrooz M Senfi
(74) *Attorney, Agent, or Firm* — Arch & Lake LLP; Hao Tan; Shen Wang

(57) ABSTRACT

Methods for video decoding and encoding, apparatuses and non-transitory storage media are provided. In one decoding method, the decoder determines that an advanced motion vector prediction (AMVP)-Merge (AM) mode is enabled for a current picture or a slice of the current picture. Furthermore, the decoder obtains an AMVP motion vector (MV) of a current block in the current picture, for a first list of reference pictures LX where X is 0 or 1, as an LX MV. Moreover, the decoder obtains a list of valid merge MV candidates for a second list of reference pictures L(1–X), where the list of valid merge MV candidates comprises merge candidates that have L(1–X) MV. Further, the decoder selects an L(1–X) MV of the AM mode among the list of valid merge MV candidates.

20 Claims, 11 Drawing Sheets

Related U.S. Application Data

(60) Provisional application No. 63/319,763, filed on Mar. 14, 2022.

(51) Int. Cl.
H04N 19/172 (2014.01)
H04N 19/176 (2014.01)

(58) Field of Classification Search
CPC .... H04N 19/44; H04N 19/521; H04N 19/567; H04N 19/577
USPC ...................................................... 375/240.25
See application file for complete search history.

(56) References Cited

U.S. PATENT DOCUMENTS

| | | | |
|---|---|---|---|
| 2019/0110058 A1 | 4/2019 | Chien et al. | |
| 2020/0374542 A1 | 11/2020 | Zhang et al. | |
| 2021/0105463 A1 * | 4/2021 | Zhang | H04N 19/52 |
| 2022/0046272 A1 * | 2/2022 | Zhang | H04N 19/139 |
| 2024/0406436 A1 * | 12/2024 | Kim | H04N 19/573 |

OTHER PUBLICATIONS

Zhi Zhang et al., "EE2-related: Bilateral matching AMVP-merge mode," Joint Video Experts Team (JVET) of ITU-T SG 16 WP 3 and ISO/IEC JTC 1/SC 29, JVET-W0106-v3, 23rd Meeting, by teleconference, Jul. 7-16, 2021, (7p).
Zhi Zhang et al., "EE2: Bilateral and template matching AMVP-merge mode (test 3.3)," Joint Video Experts Team (JVET) of ITU-T SG 16 WP 3 and ISO/IEC JTC 1/SC 29, JVET-X0083-v1, 24th Meeting, by teleconference, Oct. 6-15, 2021, (3p).
Extended European Search Report of EP Application No. 23771342.5 dated Mar. 4, 2026, (13p).
Jianle Chen et al., "Algorithm description for Versatile Video Coding and Test Model 6 (VTM 6)", Joint Video Experts Team (JVET) of ITU-T SG 16 WP 3 and ISO/IEC JTC 1/SC 29/WG 11, JVET-O2002-v2, 15th Meeting: Gothenburg, SE, Jul. 3-12, 2019, (89p).

* cited by examiner

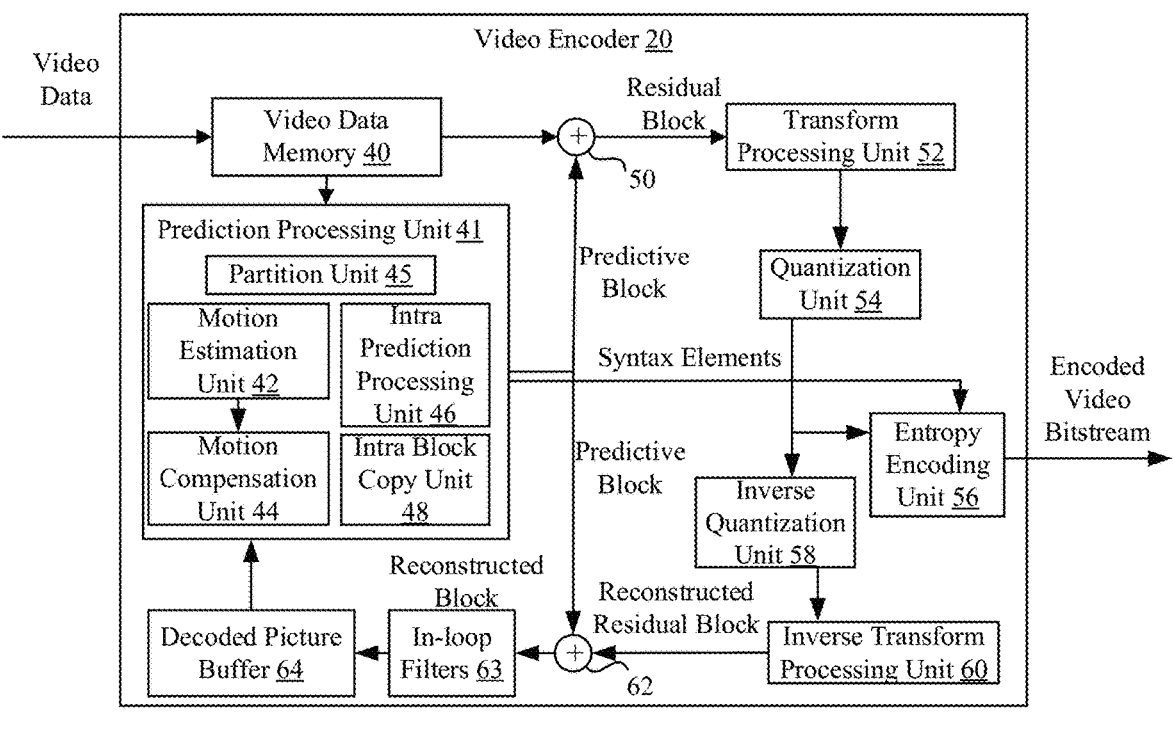
FIG. 1G
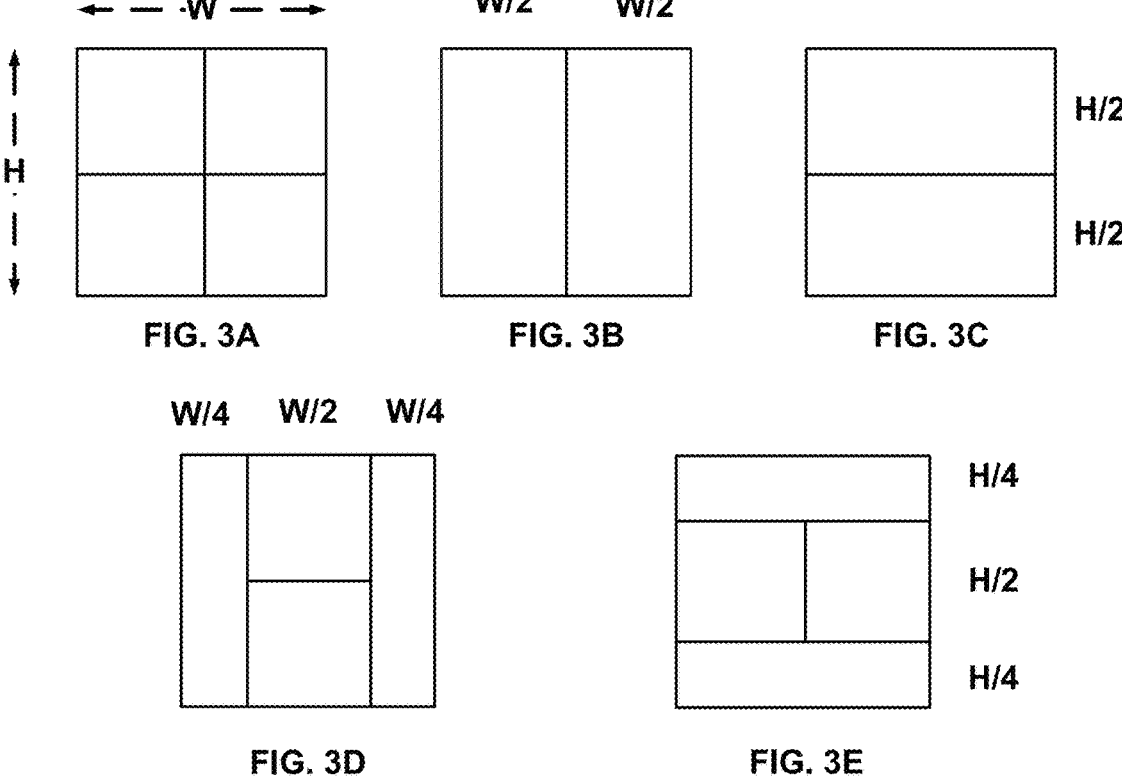
FIG. 3A         FIG. 3B         FIG. 3C
FIG. 3D         FIG. 3E

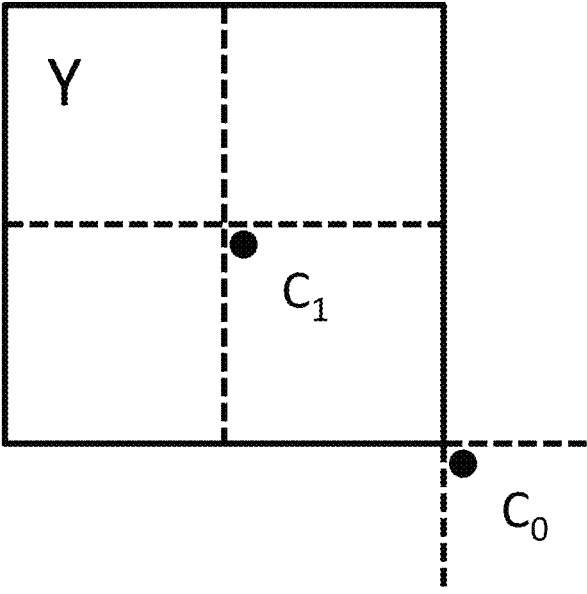
FIG. 4D
LO reference
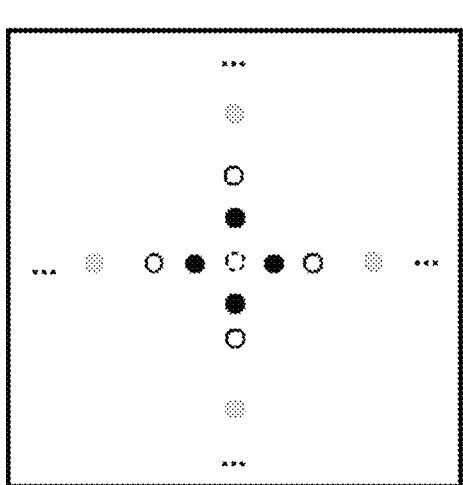
L1 reference
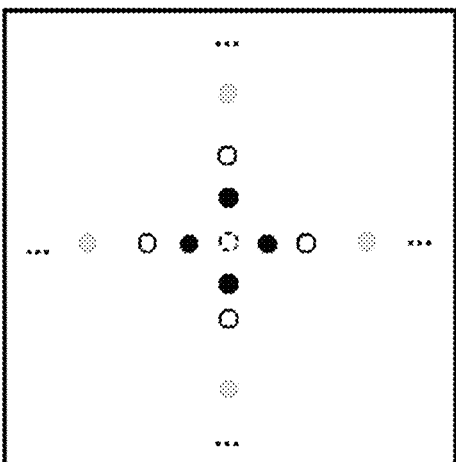
FIG. 5

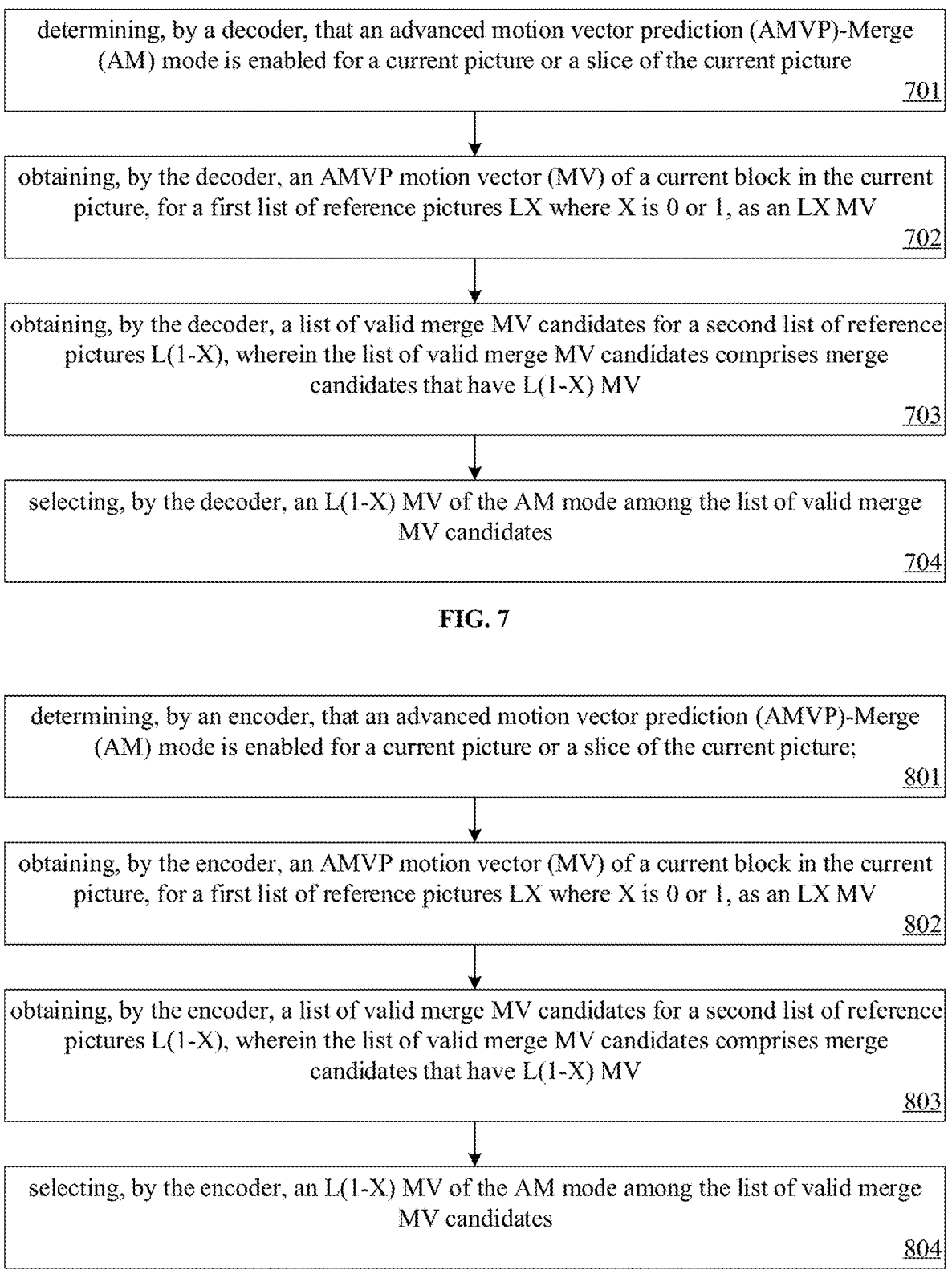

determining, by a decoder, that an advanced motion vector prediction (AMVP)-Merge (AM) mode is enabled for a current picture or a slice of the current picture
701 obtaining, by the decoder, an AMVP motion vector (MV) of a current block in the current picture, for a first list of reference pictures LX where X is 0 or 1, as an LX MV
702 obtaining, by the decoder, a list of valid merge MV candidates for a second list of reference pictures L(1-X), wherein the list of valid merge MV candidates comprises merge candidates that have L(1-X) MV
703 selecting, by the decoder, an L(1-X) MV of the AM mode among the list of valid merge MV candidates
704

FIG. 7 determining, by an encoder, that an advanced motion vector prediction (AMVP)-Merge (AM) mode is enabled for a current picture or a slice of the current picture;
801 obtaining, by the encoder, an AMVP motion vector (MV) of a current block in the current picture, for a first list of reference pictures LX where X is 0 or 1, as an LX MV
802 obtaining, by the encoder, a list of valid merge MV candidates for a second list of reference pictures L(1-X), wherein the list of valid merge MV candidates comprises merge candidates that have L(1-X) MV
803 selecting, by the encoder, an L(1-X) MV of the AM mode among the list of valid merge MV candidates
804

FIG. 8

INTER PREDICTION IN VIDEO CODING

CROSS-REFERENCE TO RELATED APPLICATION

The present application is a Continuation Application of International Application No. PCT/US2023/015232, filed on Mar. 14, 2023, which is filed upon and claims priority to U.S. Provisional Application No. 63/319,763, entitled "Inter Prediction in Video Coding," filed on Mar. 14, 2022, the entireties of which are incorporated herein by reference for all purposes.

FIELD

The present disclosure relates to video coding and compression, and in particular but not limited to, methods and apparatus for inter prediction in video coding.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. One Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Moreover, ITU-T VCEG (Q6/16) and ISO/IEC MPEG (JTC 1/SC 29/WG 11) are studying the potential need for standardization of future video coding technology with a compression capability that significantly exceeds that of the current VVC standard. Such future standardization action may either take the form of additional extension(s) of VVC or an entirely new standard. The Joint Video Exploration Team (JVET) is working on this exploration activity to evaluate compression technology designs proposed by their experts in this area. The first Exploration Experiments (EE) were established in JVET meeting during 6-15 Jan. 2021 and this exploration software model is named as Enhanced Compression Model (ECM) and ECM version2 (ECM2) was released on August 2021.

SUMMARY

The present disclosure provides examples of techniques relating to inter prediction in video coding, and in particular relating to bilateral matching AMVP-merge mode in ECM.

According to a first aspect of the present disclosure, there is provided a method of video decoding. In the method of video decoding, a decoder may determine that an advanced motion vector prediction (AMVP)-Merge (AM) mode is enabled for a current picture or a slice of the current picture. Additionally, the decoder may obtain an AMVP motion vector (MV) of a current block in the current picture, for a first list of reference pictures LX where X is 0 or 1, as an LX MV. Furthermore, the decoder may obtain a list of valid merge MV candidates for a second list of reference pictures L(1−X), where the list of valid merge MV candidates comprises merge candidates that have L(1−X) MV. Further, the decoder may select an L(1−X) MV of the AM mode among the list of valid merge MV candidates.

According to a second aspect of the present disclosure, there is provided a method of video encoding. In the method of video encoding, an encoder may determine that an advanced motion vector prediction (AMVP)-Merge (AM) mode is enabled for a current picture or a slice of the current picture. Additionally, the encoder may obtain an AMVP motion vector (MV) of a current block in the current picture, for a first list of reference pictures LX where X is 0 or 1, as an LX MV. Furthermore, the encoder may obtain a list of valid merge MV candidates for a second list of reference pictures L(1−X), where the list of valid merge MV candidates comprises merge candidates that have L(1−X) MV. Further, the encoder may select an L(1−X) MV of the AM mode among the list of valid merge MV candidates.

According to a third aspect of the present disclosure, there is provided an apparatus for video decoding. The apparatus includes one or more processors and a memory coupled to the one or more processors and configured to store instructions executable by the one or more processors. Furthermore, the one or more processors, upon execution of the instructions, are configured to perform the method according to the first aspect above.

According to a fourth aspect of the present disclosure, there is provided an apparatus for video encoding. The apparatus includes one or more processors and a memory coupled to the one or more processors and configured to store instructions executable by the one or more processors.

Furthermore, the one or more processors, upon execution of the instructions, are configured to perform the method according to the second aspect above.

According to a fifth aspect of the present disclosure, there is provided a non-transitory computer-readable storage medium storing computer-executable instructions that, when executed by one or more computer processors, cause the one or more computer processors to receive a bitstream, and perform the method according to the first aspect.

According to a sixth aspect of the present disclosure, there is provided a non-transitory computer-readable storage medium storing computer-executable instructions that, when executed by one or more computer processors, cause the one or more computer processors to perform the method according to the second aspect to encode the current block into a bitstream, and transmit the bitstream.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 3A is a diagram illustrating block partitions in a multi-type tree structure in accordance with some examples of the present disclosure.

FIG. 3B is a diagram illustrating block partitions in a multi-type tree structure in accordance with some examples of the present disclosure.

FIG. 3C is a diagram illustrating block partitions in a multi-type tree structure in accordance with some examples of the present disclosure.

FIG. 3D is a diagram illustrating block partitions in a multi-type tree structure in accordance with some examples of the present disclosure.

FIG. 3E is a diagram illustrating block partitions in a multi-type tree structure in accordance with some examples of the present disclosure.

FIG. 4D illustrates candidate positions for temporal merge candidates $C_0$ and $C_1$ in accordance with some examples of the present disclosure.

FIG. 5 illustrates MMVD search point in accordance with some examples of the present disclosure.

FIG. 7 is a flow chart illustrating a method for video decoding in accordance with some examples of the present disclosure.

FIG. 8 is a flow chart illustrating a method for video encoding corresponding to the method for video decoding as shown in FIG. 7 in accordance with some examples of the present disclosure.

DETAILED DESCRIPTION

Figure 1A:
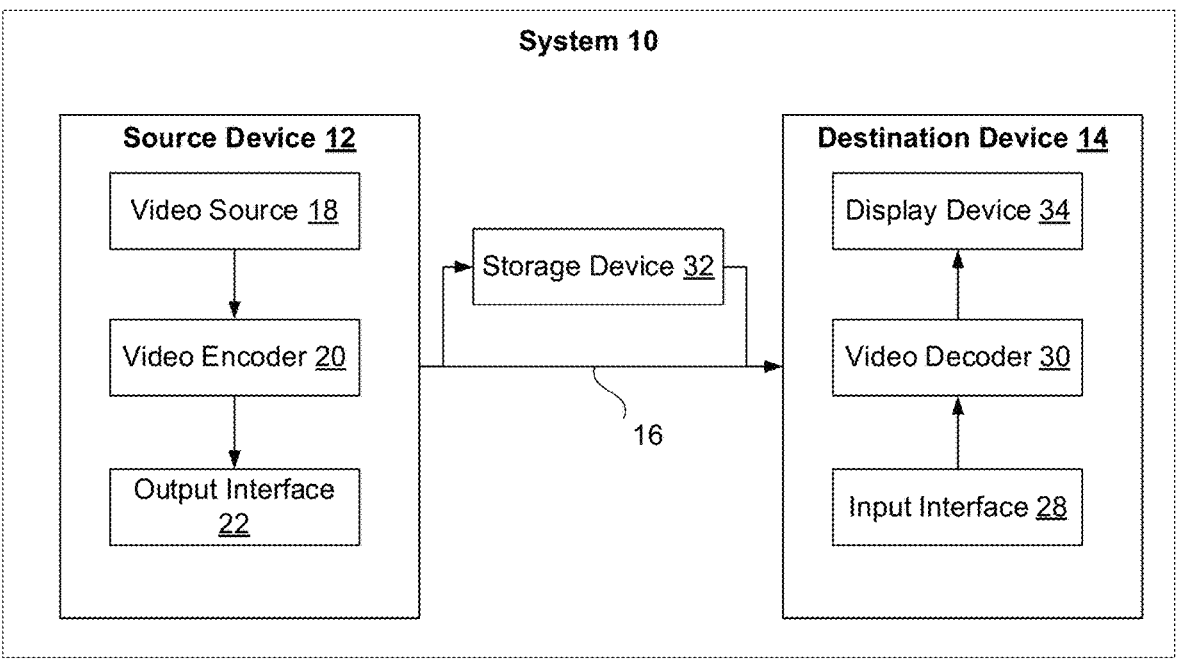
FIG. 1A is a block diagram illustrating a system for encoding and decoding video blocks in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Terms used in the disclosure are only adopted for the purpose of describing specific embodiments and not intended to limit the disclosure. "A/an," "said," and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i)

when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1A is a block diagram illustrating an exemplary system 10 for encoding and decoding video blocks in parallel in accordance with some implementations of the present disclosure. As shown in FIG. 1A, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of moving the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 1A, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter. The encoded video data may comprise a sequence of pictures, each of which may comprise one or more sample arrays, for example, luma (Y) only for monochrome; luma and two chroma in YCbCr or YCgCo domain; or green, blue, and red in GBR (also known as RGB) domain. For convenience of notation and terminology in this application, in some embodiments, variables and terms associated with each set of three sample arrays may be referred to as luma and chroma, where the two chroma arrays may be referred to as Cb and Cr, regardless of the actual color representation method in use. The video data may be in a chroma format of 4:0:0, 4:2:0, 4:2:2, or 4:4:4, but the present application is not limited thereto.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Like HEVC, VVC is built upon the block-based hybrid video coding framework. FIG. 1B is a block diagram illustrating a block-based video encoder in accordance with some implementations of the present disclosure. In the encoder 100, the input video signal is processed block by block, called coding units (CUs). The encoder 100 may be the video encoder 20 as shown in FIG. 1A. In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG. 3B), horizontal binary partitioning (FIG. 3C), vertical extended ternary partitioning (FIG. 3D), and horizontal extended ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 1B:
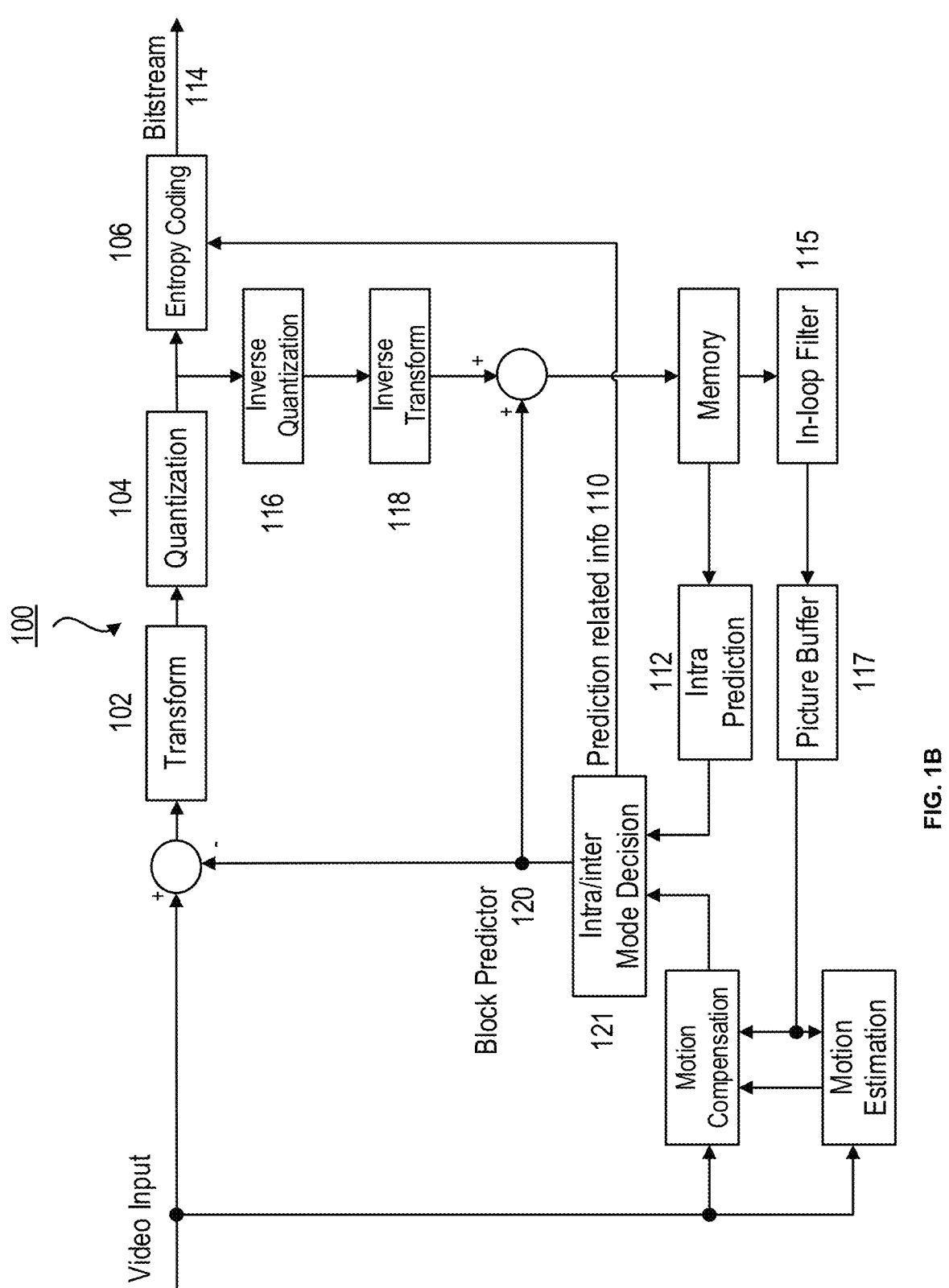
FIG. 1B is a block diagram of an encoder in accordance with some examples of the present disclosure.
Figure 2A:
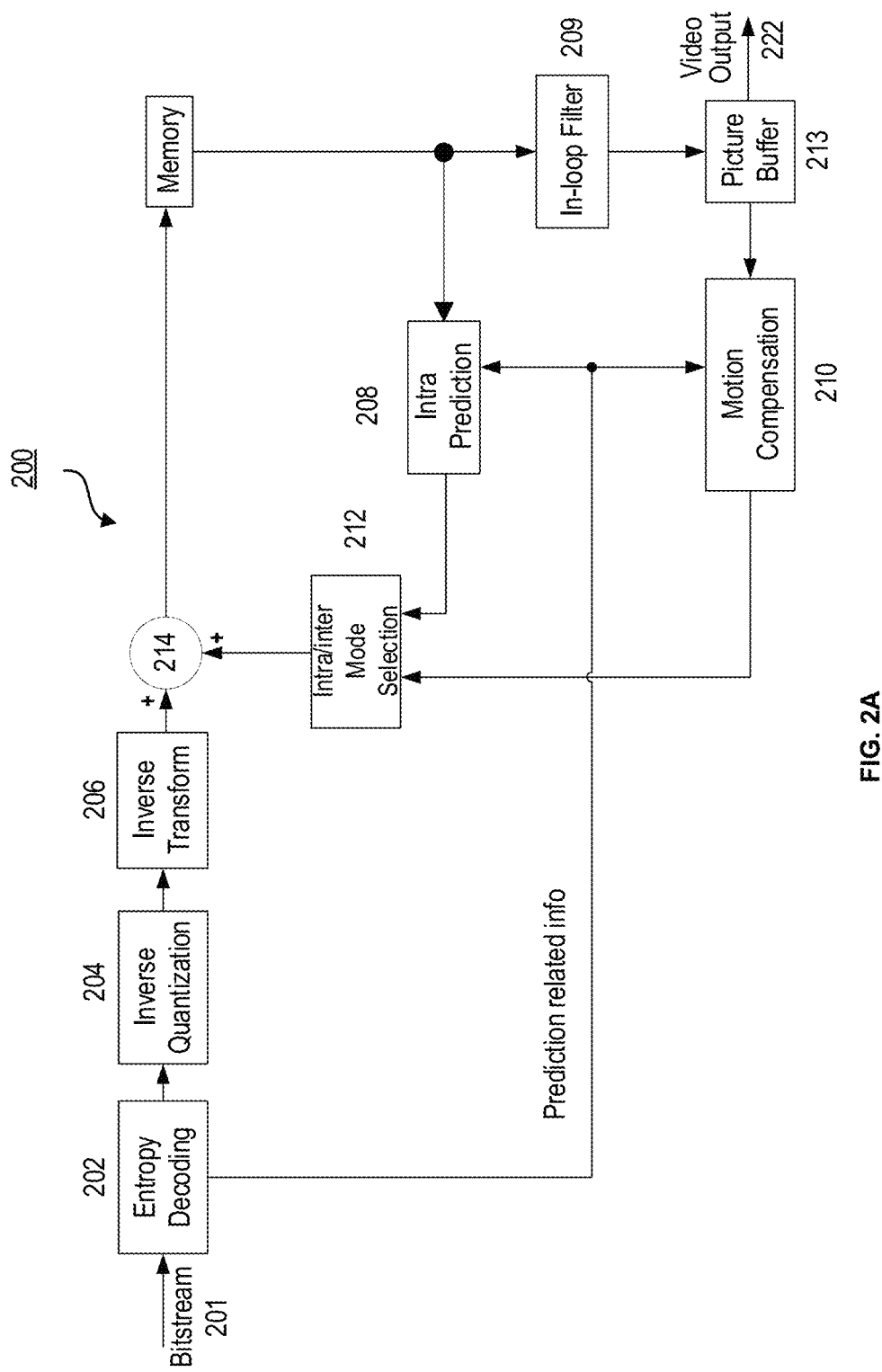
FIG. 2A is a block diagram of a decoder in accordance with some examples of the present disclosure.

FIG. 2A is a block diagram illustrating a block-based video decoder 200 which may be used in conjunction with many video coding standards. This decoder 200 is similar to the reconstruction-related section residing in the encoder 100 of FIG. 1B. The block-based video decoder 200 may be the video decoder 30 as shown in FIG. 1A. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

FIG. 1G is a block diagram illustrating another exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 1G, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. It should be illustrated that for the CCSAO technique, the present application is not limited to the embodiments described herein, and instead, the application may be applied to a situation where an offset is selected for any of a luma component and two chroma components (which may represent Y, Cb and Cr in YCbCr domain; Y, Cg and Co in YCgCo domain; or G, B and R in RGB domain for convenience of notation and terminology in this application as described above) according to any other of the luma component and the two chroma components to modify said any component based on the selected offset. Further, it should also be illustrated that a first component mentioned herein may be any of the luma component and the two chroma components, a second component mentioned herein may be any other of the luma component and the two chroma components, and a third component mentioned herein may be a remaining one of the luma component and the two chroma components. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1A. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 1G, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1A, or archived in the storage device 32 as shown in FIG. 1A for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 2B:
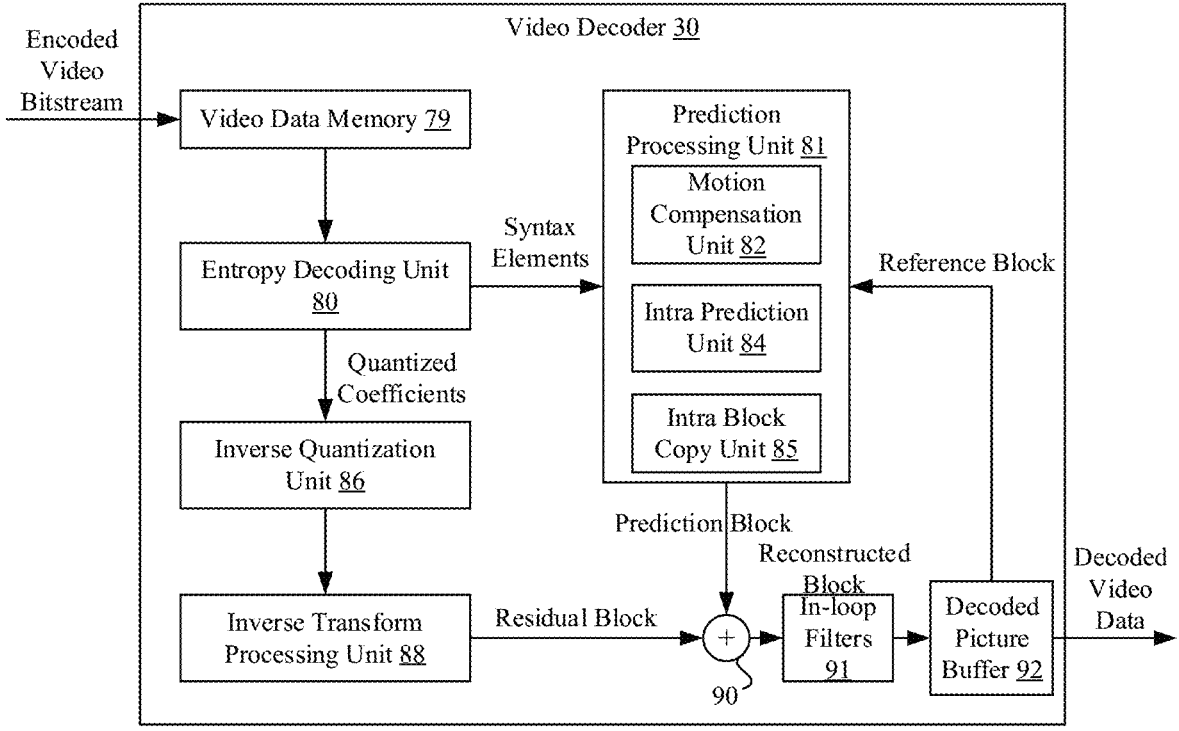
FIG. 2B is a block diagram illustrating an exemplary video decoder in accordance with some examples of the present disclosure

FIG. 2B is a block diagram illustrating another exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 1G. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 2B. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1A.

In the current VVC standards, motion information of the current coding block is either copied from spatial or temporal neighboring blocks specified by a merge candidate index or obtained by explicit signaling of motion estimation.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 1C:
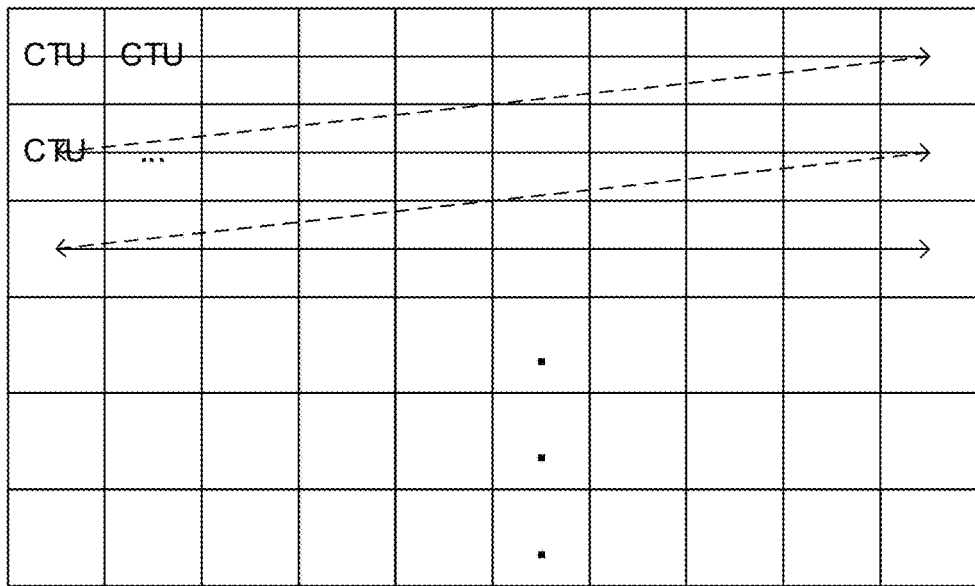
FIGS. 1C-IF are block diagrams illustrating how a frame is recursively partitioned into multiple video blocks of different sizes and shapes in accordance with some examples of the present disclosure.
Figure 1D:
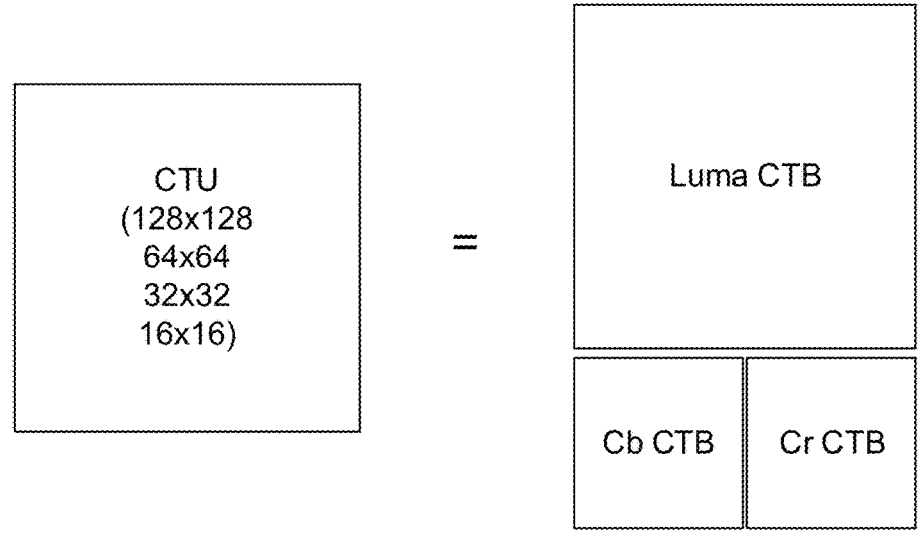
FIG. 1G is a block diagram illustrating an exemplary video encoder in accordance with some examples of the present disclosure

As shown in FIG. 1C, the video encoder 20 (or more specifically a partition unit in a prediction processing unit of the video encoder 20) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 1D, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 1F:
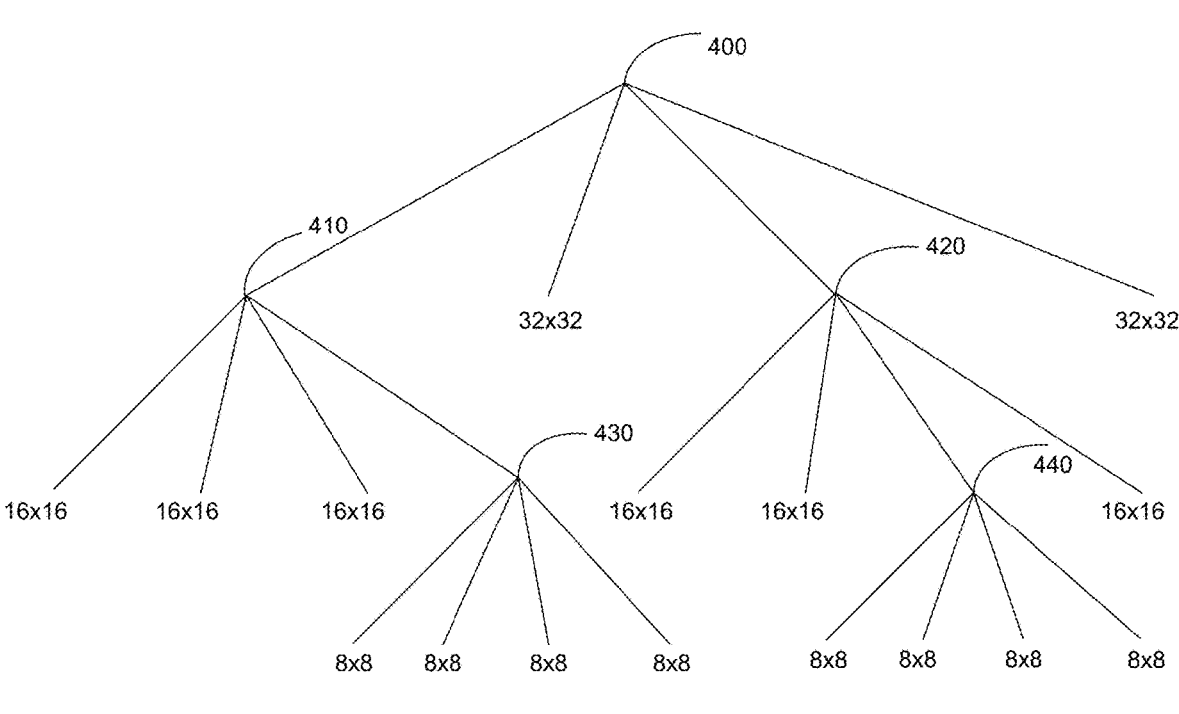
Figure 1E:
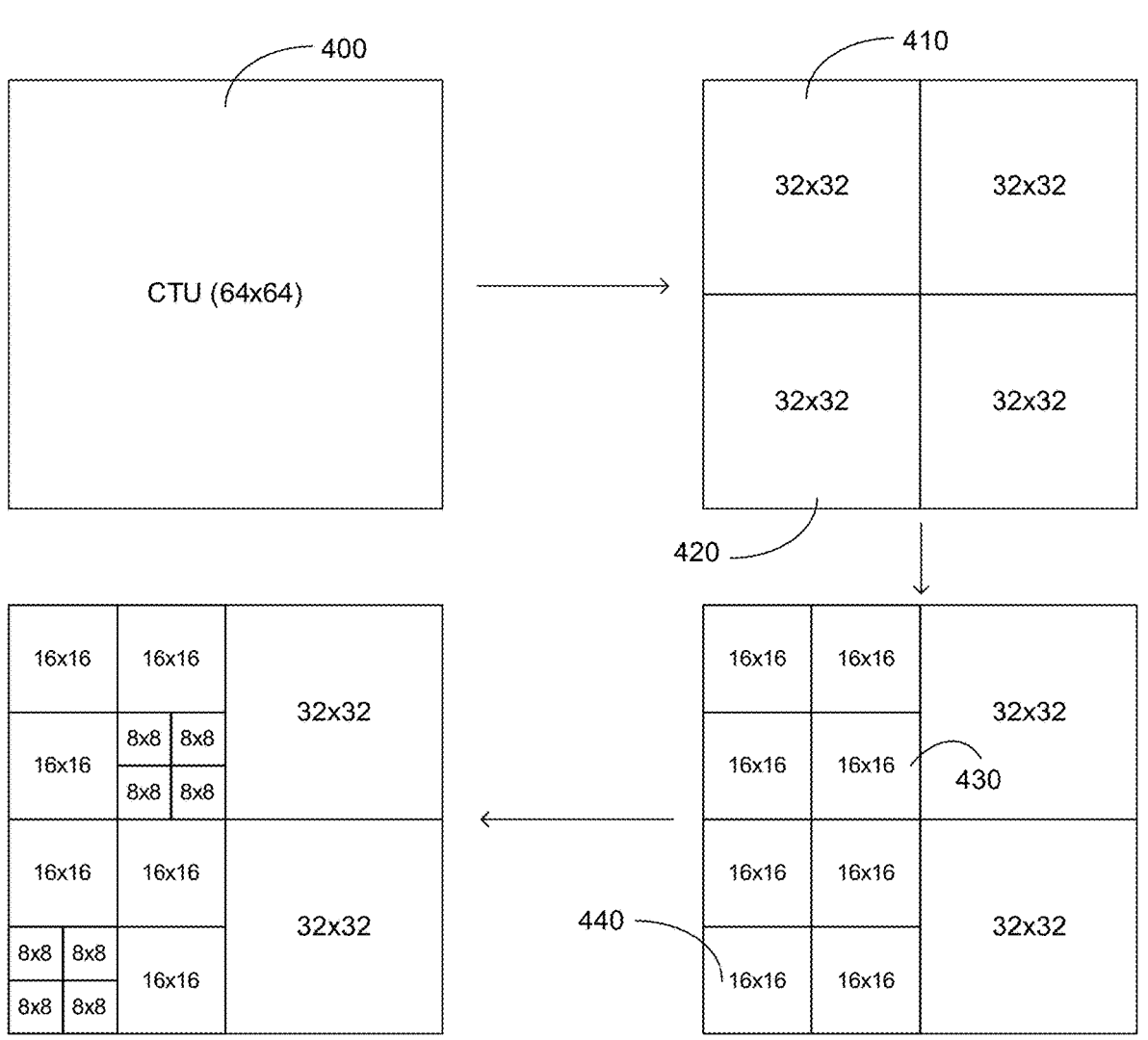

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 1E, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 1F depicts a quad-tree data structure illustrating the end result of the partition process of the CTU 400 as depicted in FIG. 1E, each leaf node of the quad-tree corresponding to one CU of a respective size ranging from 32×32 to 8×8. Like the CTU depicted in FIG. 1D, each CU may include a CB of luma samples and two corresponding coding blocks of chroma samples of a frame of the same size, and syntax elements used to code the samples of the coding blocks. In monochrome pictures or pictures having three separate color planes, a CU may include a single coding block and syntax structures used to code the samples of the coding block. It should be noted that the quad-tree partitioning depicted in FIGS. 1E-IF is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIGS. 3A-3E, there are five possible partitioning types of a coding block having a width W and a height H, i.e., quaternary partitioning, vertical binary partitioning, horizontal binary partitioning, vertical extended ternary partitioning, and horizontal extended ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 1E, the video encoder 20 may use quad-trec partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block.

The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Ch coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit as described above in connection with FIG. 1B, the motion vector predictor of the current CU is subtracted from the actual motion vector of the current CU to produce a Motion Vector Difference (MVD) for the current CU. By doing so, there is no need to encode the motion vector determined by the motion estimation unit for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

For each inter-predicted CU, motion parameters including motion vectors, reference picture indices and reference picture list usage index, and additional information needed for the new coding feature of VVC may be used for inter-predicted sample generation. The motion parameters may be signaled in an explicit or implicit manner. When a CU is coded with skip mode, the CU is associated with one PU and has no significant residual coefficients, no coded motion vector delta (motion vector difference) or reference picture index. A merge mode is specified whereby the motion parameters for the current CU are obtained from neighboring CUs, including spatial and temporal candidates, and additional schedules introduced in VVC. The merge mode may be applied to any inter-predicted CU, not only for skip mode. The alternative to merge mode is the explicit transmission of motion parameters, where motion vector, corresponding reference picture index for each reference picture list and reference picture list usage flag and other needed information are signaled explicitly per each CU.

Extended Merge Mode

In some embodiments, the merge candidate list is constructed by including the following five types of candidates in order:

(1) Spatial MVP from spatial neighbor CUs;
(2) Temporal MVP from collocated CUs;
(3) History-based MVP from a first in first out (FIFO) table;
(4) Pairwise average MVP; and
(5) Zero MVs.

The size of merge list is signaled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided above. In some embodiments, parallel derivation of the merging candidate lists may be supported for all CUs within a certain size of area.

Spatial Candidate Derivation

Figure 4A:
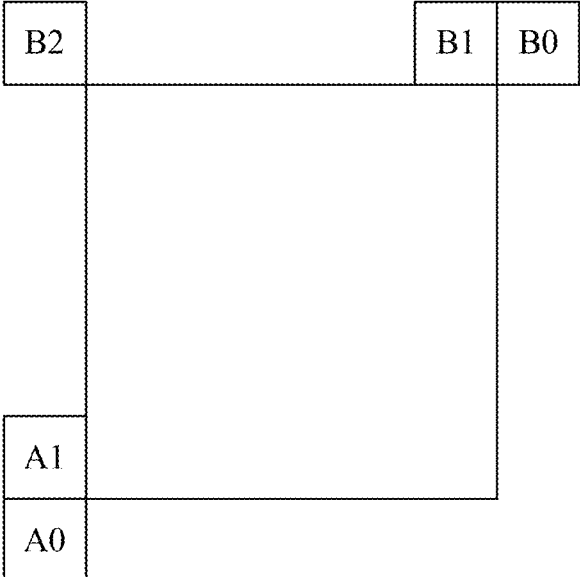
FIG. 4A illustrates positions of spatial merge candidates in accordance with some examples of the present disclosure.
Figure 4B:
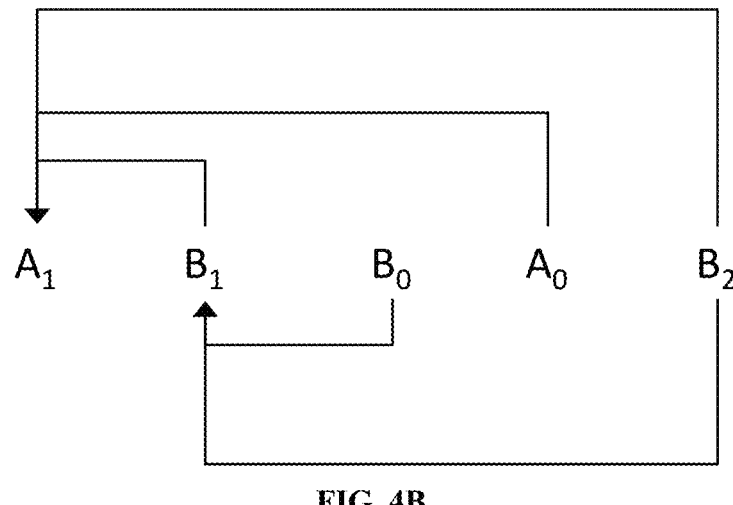
FIG. 4B illustrates candidate pairs that are considered for redundancy check of spatial merge candidates in accordance with some examples of the present disclosure.

The derivation of spatial merge candidates in VVC is same to that in HEVC except the positions of first two merge candidates are swapped. A maximum of four merge candidates are selected among candidates located in the positions depicted in FIG. 4A. The order of derivation is B0, A0, B1, A1 and B2. Position B2 is considered only when one or more than one CUs of position B0, A0, B1, A1 are not available (e.g., because it belongs to another slice or tile) or is intra coded. After candidate at position A1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead, only the pairs linked with an arrow in FIG. 4B are considered and a candidate is only added to the list if the corresponding candidate used for redundancy check has not the same motion information. FIG. 4B illustrates candidate pairs that are considered for redundancy check of spatial merge candidates.

Temporal Candidate Derivation

Figure 4C:
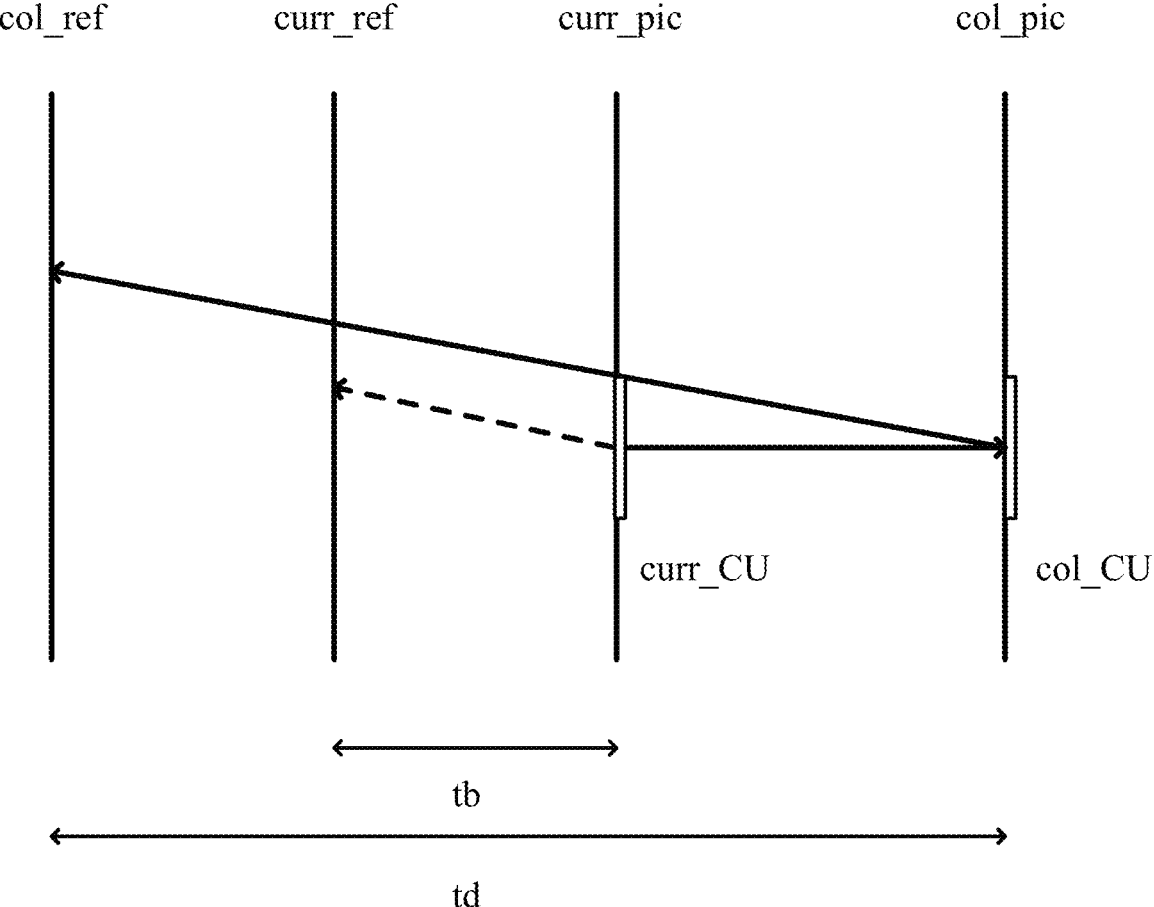
FIG. 4C illustrates motion vector scaling for temporal merge candidates in accordance with some examples of the present disclosure.

In this step, only one candidate is added to the list. Particularly, in the derivation of this temporal merge candidate, a scaled motion vector is derived based on co-located CU belonging to the collocated reference picture. The reference picture list and the reference index to be used for derivation of the co-located CU is explicitly signaled in the slice header. The scaled motion vector for temporal merge candidate is obtained as illustrated by the dotted line in FIG. 4C, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

The position for the temporal candidate is selected between candidates C0 and C1, as depicted in FIG. 4D. If CU at position C0 is not available, is intra coded, or is outside of the current row of CTUs, position C1 is used. Otherwise, position C0 is used in the derivation of the temporal merge candidate.

History-Based Merge Candidate Derivation

The history-based MVP (HMVP) merge candidates are added to merge list after the spatial MVP and temporal motion vector prediction (TMVP). In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S may be set to be 6, which indicates up to 5 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates may be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of operations for redundancy check, the following simplifications are introduced. First, the last two entries in the table are redundancy checked to A1 and B1 spatial candidates, respectively. Second, once the total number of available merge candidates reaches the maximally allowed merge candidates minus 1, the merge candidate list construction process from HMVP is terminated.

Pair-Wise Average Merge Candidates Derivation

Pairwise average candidates are generated by averaging predefined pairs of candidates in the existing merge candidate list, using the first two merge candidates. The first merge candidate is defined as p0Cand and the second merge candidate can be defined as p1Cand, respectively. The averaged motion vectors are calculated according to the availability of the motion vector of p0Cand and p1Cand separately for each reference list. If both motion vectors are available in one list, these two motion vectors are averaged even when they point to different reference pictures, and its reference picture is set to the one of p0Cand; if only one motion vector is available, use the one directly; if no motion vector is available, keep this list invalid. Also, if the half-pel interpolation filter indices of p0Cand and p1Cand are different, it is set to 0.

When the merge list is not full after pair-wise average merge candidates are added, the zero MVPs are inserted at the end of the merge list until the maximum merge candidate number is encountered.

High Precision ($\frac{1}{16}$ pel) Motion Compensation and Motion Cector Storage In the VVC standards, the MV precision is increased to $\frac{1}{16}$ luma sample, to improve the prediction efficiency of slow motion video. This higher motion accuracy is particularly helpful for video contents with locally varying and non-translational motion such as in the case of affine mode. For fractional position samples generation of higher MV accuracy, HEVC's 8-tap luma interpolation filters and 4-tap chroma interpolation filters are extended to 16 phases for luma and 32 phases for chroma. This extended filter set is applied in MC process of inter coded CUs except the CUs in affine mode. For affine mode, a set of 6-tap luma interpolation filter with 16 phases is used for lower computational complexity as well as memory bandwidth saving.

The highest precision of explicitly signaled motion vectors for non-affine CU is quarter-luma-sample. In some inter prediction modes such as the affine mode, motion vectors can be signalled at $\frac{1}{16}$-luma-sample precision. In all inter coded CU with implicitly inferred MVs, the MVs are derived at $\frac{1}{16}$-luma-sample precision and motion compensated prediction is performed at $\frac{1}{16}$-sample-precision. In terms of internal motion field storage, all motion vectors are stored at $\frac{1}{16}$-luma-sample precision.

For temporal motion field storage used by TMVP and SbTVMP, motion field compression is performed at 8×8 size granularity in contrast to the 16×16 size granularity in HEVC.

Merge Mode with MVD (MMVD)

In addition to merge mode, where the implicitly derived motion information is directly used for prediction samples generation of the current CU, the merge mode with motion vector differences (MMVD) is introduced. An MMVD flag is signalled right after sending a regular merge flag to specify whether MMVD mode is used for a CU. After a merge candidate is selected, it is further refined by the signaled MVDs information. The further information includes a merge candidate flag, an index to specify motion magnitude, and an index for indication of motion direction. In MMVD mode, one for the first two candidates in the merge list is selected to be used as MV basis. The MMVD candidate flag is signaled to specify which one is used between the first and second merge candidates.

Distance index specifies motion magnitude information and indicate the predefined offset from the starting point. As shown in FIG. 5, an offset is added to either horizontal component or vertical component of starting MV. The relation of distance index and pre-defined offset is specified in Table 1.

TABLE 1

| The relation of distance index and pre-defined offset | | | | | | | | |
|---|---|---|---|---|---|---|---|---|
| Distance IDX | 0 | 1 | 2 | 3 | 4 | 5 | 6 | 7 |
| Offset (in unit of luma sample) | $\frac{1}{4}$ | $\frac{1}{2}$ | 1 | 2 | 4 | 8 | 16 | 32 |

Direction index represents the direction of the MVD relative to the starting point. The direction index can represent the four directions as shown in Table 2. It is noted that the meaning of MVD sign may be variant according to the information of starting MVs. When the starting MV is an un-prediction MV or bi-prediction MVs with both lists pointing to the same side of the current picture (i.e. POCs of two references are both larger than the POC of the current picture, or are both smaller than the POC of the current picture), the sign in Table 2 specifies the sign of MV offset added to the starting MV. When the starting MV is bi-prediction MVs with the two MVs pointing to the different sides of the current picture (i.e. the POC of one reference is larger than the POC of the current picture, and the POC of the other reference is smaller than the POC of the current picture), and the difference of POC in list 0 is greater than the one in list 1, the sign in Table 2 specifies the sign of MV offset added to the list0 MV component of starting MV and the sign for the list1 MV has opposite value. Otherwise, if the difference of POC in list 1 is greater than list 0, the sign in Table 2 specifies the sign of MV offset added to the list1 MV component of starting MV and the sign for the list0 MV has opposite value.

The MVD is scaled according to the difference of POCs in each direction. If the differences of POCs in both lists are the same, no scaling is needed. Otherwise, if the difference of POC in list 0 is larger than the one of list 1, the MVD for list 1 is scaled, by defining the POC difference of L0 as td and POC difference of L1 as tb, described in FIG. 4C. If the POC difference of L1 is greater than L0, the MVD for list 0 is scaled in the same way. If the starting MV is uni-predicted, the MVD is added to the available MV.

TABLE 2

| Sign of MV offset specified by direction index | | | | |
| --- | --- | --- | --- | --- |
| Direction IDX | 00 | 01 | 10 | 11 |
| x-axis | + | − | N/A | N/A |
| y-axis | N/A | N/A | + | − |

Symmetric MVD Coding

Besides the normal unidirectional prediction and bi-directional prediction mode MVD signalling, symmetric MVD mode for bi-predictional MVD signalling may be applied. In the symmetric MVD mode, motion information including reference picture indices of both list-0 and list-1 and MVD of list-1 are not signaled but derived.

The decoding process of the symmetric MVD mode is as follows:

At slice level, variables BiDirPredFlag, RefIdxSymL0 and RefIdxSymL1 are derived as follows:

If mvd_l1_zero_flag is 1, BiDirPredFlag is set equal to 0.

Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise, BiDirPredFlag is set to 0.

At CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad (1)$$

In the encoder, symmetric MVD motion estimation starts with initial MV evaluation. A set of initial MV candidates comprising the MV obtained from uni-prediction search, the MV obtained from bi-prediction search and the MVs from the AMVP list. The one with the lowest rate-distortion cost is chosen to be the initial MV for the symmetric MVD motion search.

Bilateral Matching AMVP-Merge Mode

In the bilateral matching AMVP-Merge mode (which is also termed AM mode in the disclosure), the bi-directional predictor is composed of an AMVP predictor in one direction and a merge predictor in the other direction. The mode may be enabled to a coding block when the selected merge predictor and the AMVP predictor satisfy the condition that there is at least one reference picture from the past and one reference picture from the future relatively to the current picture.

The AMVP part of the AM mode is signaled as a regular uni-directional AMVP, i.e. reference index and MVD are signaled, and it has a derived MVP index if template matching is used or MVP index is signaled when template matching is disabled.

For AMVP direction LX (X may be 0 or 1; and L stands for list of reference pictures), the merge part in the other direction L(1−X) is implicitly derived by minimizing the bilateral matching cost between the AMVP predictor and a merge predictor, i.e., for a pair of the AMVP and a merge motion vectors. For every merge candidate in the merge candidate list which has that other direction L(1−X) motion vector, the bilateral matching cost is calculated using the merge candidate MV and the AMVP MV. The merge candidates are then sorted by the bilateral matching cost. The merge index is then signaled into the bitstream to indicate which merge candidate among the first 2 sorted candidates is selected. The derivation of the list of mv merge candidates of L(1−X) for AM mode basically follows the similar procedure of regular merge list construction as described in the previous paragraphs. The encoder or decoder searches different merge candidates (including spatial, temporal, HMVP, pair average and zero candidates) and insert the valid L(1−X) mv of the different merge candidates into the list of mv merge candidates for AM mode. The L(1−X) mv is regarded as valid when all the following criteria are met. Otherwise, when at least one of the following criteria is not met, this L(1−X) mv candidate is regarded as no valid. The criteria are:

1. The merge candidate has L(1−X) mv. For example, when X is 0 and the merge candidate is bi-directional predicted or L1 uni-directional predicted, this L(1−X) mv candidate is regarded as valid.

2. The reference picture of the L(1−X) mv of the merge candidate has to be in the opposite direction of the reference picture of the LX mv of the AMVP mode derived mv.

The bilateral matching refinement or template matching is then applied to the coding block with the selected merge candidate MV and the AMVP MV as a starting point. Specifically, when the distances from two reference pictures to the current picture are the same (the distance is measured by the displaying order such as picture order count defined in the VVC or HEVC), the bilateral matching MV refinement is applied for the merge candidate MV and AMVP MVP as a starting point. Otherwise, if template matching functionality is enabled, template matching MV refinement is applied to the merge predictor or the AMVP predictor which has a higher template matching cost.

The AM mode is indicated by a flag. In the current VVC and ECM, since AM mode is not allowed when all the reference pictures are from the past (in terms of displaying order), this indication flag does not need to be signaled under this condition. Furthermore, if AM mode is enabled for a CU, AMVP direction LX is further indicated by a flag. But when "ph_mvd_l1_zero_flag" is enabled (e.g., ph_mvd_l1_zero_flag=1) for that picture, the indication of the AMVP direction LX does not need to be signal and is assumed to be L0 (in other words, the Merge direction is L1) because when "ph_mvd_l1_zero_flag" is enabled, no mvd is signaled for the L1 mv of a bi-directional AMVP coded CU.

Moreover, the reference picture index is conditionally signaled in the bitstream based on whether the reference picture of the AMVP direction LX and the reference picture of the merge direction L(1−X) are in the opposite directions, that is, one reference picture is before the current picture (e.g., the coded picture in the past) while the other one is behind the current picture (e.g., the coded picture in the future).

As mentioned above, the existing bilateral matching AMVP-merge mode in the ECM has constraints that the mode can be enabled to a coding block which meets both the following conditions: the selected merge predictor and the AMVP predictor satisfy DMVR condition, where there is at least one reference picture from the past and one reference picture from the future relatively to the current picture; and the distances from two reference pictures to the current picture are the same.

In this disclosure, several inter prediction schemes are proposed to change or remove the constraints of the bilateral matching AMVP-Merge mode for higher coding efficiency (e.g., better BD-rate performance) or lower complexity. The proposed schemes may be applied independently or in combination.

In one embodiment, the bilateral matching AMVP-Merge mode is enabled whether all the reference pictures are from the past or not.

To construct the list of mv merge candidates of L(1−X) for AM mode, the encoder or decoder searches different merge candidates (including spatial, temporal, HMVP, pair average and zero candidates) and inserts the valid L(1−X) mv of the different merge candidates into the list of mv merge candidates for AM mode, or the list of valid merge candidates. The L(1−X) mv is regarded as valid when the following criterion is met:

The merge candidate has L(1−X) mv. For example, when X is 0 and the merge candidate is bi-directional predicted or L1 uni-directional predicted, this L(1−X) mv candidate is regarded as valid.

That is, when the merge candidate has L(1−X) mv, the L(1−X) is deemed valid irrespective of whether a reference picture of L(1−X) MV of a merge candidate is in an opposite direction from a reference picture of the LX MV or not.

The L(1−X) merge mv of the AM mode is then implicitly selected as the one having the minimum matching cost between the LX AMVP prediction block and the L(1−X) Merge prediction block associated with each candidate among all the L(1−X) merge candidates. The matching cost may be sum of the absolute difference (SAD), sum of the squared difference (SSD) or any other means to measure the similarity between two blocks.

The bilateral matching refinement or template matching is then applied to the coding block with the selected merge candidate MV and the AMVP MV as a starting point. Specifically, when the distances from two reference pictures to the current picture are the same (the distance is measured by the displaying order such as picture order count defined in the VVC or HEVC), the bilateral matching MV refinement is applied for the merge MV candidate and AMVP MVP as a starting point. Otherwise, if template matching functionality is enabled, template matching MV refinement is applied to the merge predictor or the AMVP predictor which has a higher template matching cost.

Moreover, when only one reference picture is available for the AMVP direction LX (X can be 0 or 1; and L stands for list of reference pictures), the signaling of the reference picture index may be omitted. Otherwise, when more than one reference pictures are available for the AMVP direction LX, the reference picture index is always signaled in the bitstream for the AMVP direction LX.

In another embodiment, based on the AM mode illustrated in this disclosure, when template matching functionality is enabled, template matching MV refinement may be conditionally applied to the merge predictor or the AMVP predictor which has a higher template matching cost. In one example, template matching MV refinement is only applied to the merge predictor or the AMVP predictor which has a higher template matching cost when all the reference pictures of the current picture are from the past (e.g., all the reference pictures' display order are before the current picture).

In another example, template matching MV refinement is only applied to the merge predictor or the AMVP predictor which has a higher template matching cost when not all the reference pictures of the current picture are from the past (e.g. at least some reference pictures have a display order after the current picture).

In yet another example, template matching MV refinement is never applied to the merge predictor or the AMVP predictor no matter template matching functionality is enabled.

In another embodiment, based on the AM mode illustrated in this disclosure, the L(1−X) merge mv of the AM mode is implicitly selected as the one having the minimum difference between the LX mv and the L(1−X) mv. It is noted that the mv scaling may be required when the reference pictures between the LX mv and the L(1−X) mv are different. In one example, LX mv and L(1−X) mv have different reference pictures. The L(1−X) mv is then scaled as a new mv pointing to the same picture of the LX mv. The scaling ratio is calculated based on the temporal distance between the current picture and the two reference pictures. The difference between the LX mv and the scaled L(1−X) mv are calculated as the absolute difference of the horizontal components plus the absolute difference of the vertical components.

In another embodiment, based on the AM mode illustrated in this disclosure, the L(1−X) merge mv of the AM mode is explicitly signaled in the bitstream to indicate which merge candidate is selected for the AM mode. The merge candidate list for the AM mode may be generated using the criteria illustrated in this disclosure or the existing method in the ECM. Moreover, after the merge list is generated, the candidates reordering may be applied selectively. The reordering may be performed based on the matching cost of the AMVP predictors and the merge predictors.

In another embodiment, different schemes of AM modes may be used adaptively. In one example, the proposed AM mode (illustrated in the previous embodiments) is used when all the reference pictures of the current picture are from the past (e.g. all the reference pictures' display order are before the current picture). Otherwise, the original AM mode in the ECM is used.

In another example, the proposed AM mode (illustrated in the previous embodiments) is used when not all the reference pictures of the current picture are from the past (e.g. at least some reference pictures have a display order after the current picture). Otherwise, the original AM mode in the ECM is used.

In another example, only one merge candidate is used for AM mode when all the reference pictures of the current picture are from the past; and this merge candidate is selected among multiple merge candidates based on predefined criterion (e.g. bilateral matching error). Since only one merge candidate is directly selected, no merge index is needed to be signaled into the bitstream. Multiple merge candidates may be selected for AM mode when not all the reference pictures of the current picture are from the past; and in this condition, merge index is signaled into the bitstream to indicate which merge candidate is used for the AM mode.

In another embodiment, when "ph_mvd_l1_zero_flag" is enabled (e.g. ph_mvd_l1_zero_flag=1) for that picture (or slice) and AM mode is also enabled for that picture (or slice), the regular bi-directional inter mode is disallowed and its associated syntax elements are not needed to be signaled into the bitstream. This is because the functionalities of the regular bi-directional inter modes with list1 mvd being equal to zero and the AM mode are highly overlapping.

In the VVC specification, the syntax element "inter_pred_idc" is used to indicate the current inter block is coded in list0 uni-directional prediction, list1 uni-directional prediction or bi-directional prediction. And three different values of "inter_pred_idc" indicate the three different prediction directions (e.g. 0, 1 and 2 represent L0 prediction, L1 prediction and bi predictional, respectively). The binarization of the inter_pred_idc is illustrated in Table 3 below. cbWidth and cbHeight are the width and height of the current block or CU.

TABLE 3

| | | Bin string | |
|---|---|---|---|
| Value of inter_pred_idc | Name of inter_pred_idc | (cbWidth + cbHeight) > 12 | (cbWidth + cbHeight) = = 12 |
| Binarization for inter_pred_idc | | | |
| 0 | PRED_L0 | 00 | 0 |
| 1 | PRED_L1 | 01 | 1 |
| 2 | PRED_BI | 1 | — |

In the proposed schemes, when "ph_mvd_l1_zero_flag" and AM mode are enabled (e.g. ph_mvd_l1_zero_flag=1) for that picture (or slice), the value of inter_pred_idc used to indicate the bi-directional prediction are omitted (i.e., not signaled) as illustrated in Table 4 below. Instead, the AM mode may be used as an alternative of the regular bi-directional prediction mode.

TABLE 4

| | | Bin string | |
|---|---|---|---|
| Value of inter_pred_idc | Name of inter_pred_idc | (cbWidth + cbHeight) > 12 | (cbWidth + cbHeight) = = 12 or (ph_mvd_l1_zero_flag" and AM mode are enabled for that picture (or slice)) |
| Proposed binarization for inter_pred_idc | | | |
| 0 | PRED_L0 | 00 | 0 |
| 1 | PRED_L1 | 01 | 1 |
| 2 | PRED_BI | 1 | — |

Figure 6:
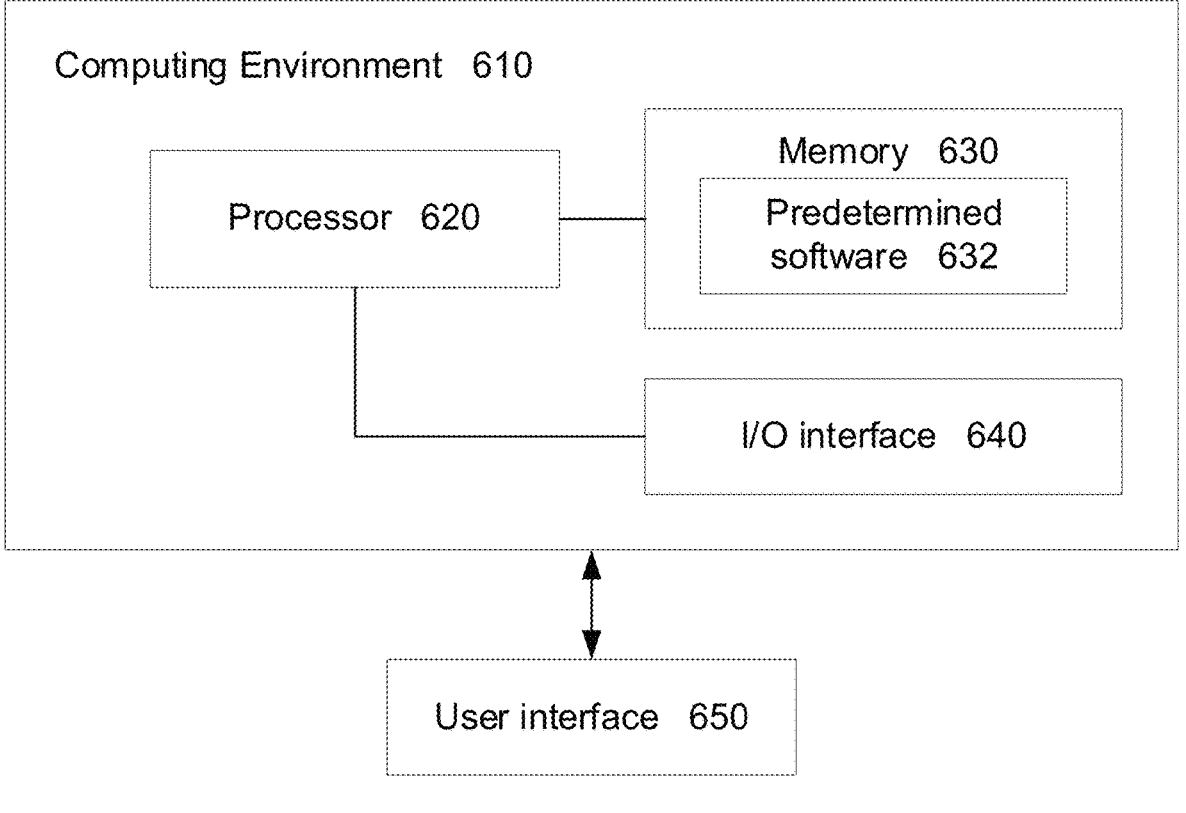
FIG. 6 illustrates a computing environment in accordance with some examples of the present disclosure.

FIG. 6 shows a computing environment 610 coupled with a user interface 650. The computing environment 610 can be part of a data processing server. The computing environment 610 includes a processor 620, a memory 630, and an Input/Output (I/O) interface 640.

The processor 620 typically controls overall operations of the computing environment 610, such as the operations associated with display, data acquisition, data communications, and image processing. The processor 620 may include one or more processors to execute instructions to perform all or some of the steps in the above-described methods. Moreover, the processor 620 may include one or more modules that facilitate the interaction between the processor 620 and other components. The processor may be a Central Processing Unit (CPU), a microprocessor, a single chip machine, a Graphical Processing Unit (GPU), or the like.

The memory 630 is configured to store various types of data to support the operation of the computing environment 610. The memory 630 may include predetermined software 632. Examples of such data includes instructions for any applications or methods operated on the computing environment 610, video datasets, image data, etc. The memory 630 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 640 provides an interface between the processor 620 and peripheral interface modules, such as a keyboard, a click wheel, buttons, and the like. The buttons may include but are not limited to, a home button, a start scan button, and a stop scan button. The I/O interface 640 can be coupled with an encoder and decoder.

In an embodiment, there is also provided a non-transitory computer-readable storage medium comprising a plurality of programs, for example, in the memory 630, executable by the processor 620 in the computing environment 610, for performing the above-described methods. Alternatively, the non-transitory computer-readable storage medium may have stored therein a bitstream or a data stream comprising encoded video information (for example, video information comprising one or more syntax elements) generated by an encoder (for example, the video encoder 20 in FIG. 2A) using, for example, the encoding method described above for use by a decoder (for example, the video decoder 30 in FIG. 3A) in decoding video data. The non-transitory computer-readable storage medium may be, for example, a ROM, a Random Access Memory (RAM), a CD-ROM, a magnetic tape, a floppy disc, an optical data storage device or the like.

In an embodiment, the is also provided a computing device comprising one or more processors (for example, the processor 620); and the non-transitory computer-readable storage medium or the memory 630 having stored therein a plurality of programs executable by the one or more processors, wherein the one or more processors, upon execution of the plurality of programs, are configured to perform the above-described methods.

In an embodiment, there is also provided a computer program product comprising a plurality of programs, for example, in the memory 630, executable by the processor 620 in the computing environment 610, for performing the above-described methods. For example, the computer program product may include the non-transitory computer-readable storage medium.

In an embodiment, the computing environment 610 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

FIG. 7 is a flowchart illustrating a method for video decoding according to an example of the present disclosure.

In step 701, the processor 620, at the decoder side, may determine that an advanced motion vector prediction (AMVP)-Merge (AM) mode is enabled for a current picture or a slice of the current picture.

In step 702, the processor 620 may obtain an AMVP motion vector (MV) of a current block in the current picture, for a first list of reference pictures LX where X is 0 or 1, as an LX MV.

In step 703, the processor 620 may obtain a list of valid merge MV candidates for a second list of reference pictures $L(1-X)$, wherein the list of valid merge MV candidates comprises merge candidates that have $L(1-X)$ MV.

In step 704, the processor 620 may select an $L(1-X)$ MV of the AM mode among the list of valid merge MV candidates.

In some examples, the merge candidates that have $L(1-X)$ MV are deemed valid irrespective of whether a reference picture of $L(1-X)$ MV of a merge candidate is in an opposite direction from a reference picture of the LX MV or not.

FIG. 8 is a flowchart illustrating a method for video encoding corresponding the method for video decoding as shown in FIG. 7.

In step 801, the processor 620, at the encoder side, may determine that an advanced motion vector prediction (AMVP)-Merge (AM) mode is enabled for a current picture or a slice of the current picture;

In step 802, the processor 620 may obtain an AMVP motion vector (MV) of a current block in the current picture, for a first list of reference pictures LX where X is 0 or 1, as an LX MV.

In step 803, the processor 620 may obtain a list of valid merge MV candidates for a second list of reference pictures $L(1-X)$, wherein the list of valid merge MV candidates comprises merge candidates that have $L(1-X)$ MV.

In step 804, the processor 620 may select an $L(1-X)$ MV of the AM mode among the list of valid merge MV candidates.

In some examples, the merge candidates that have $L(1-X)$ MV are deemed valid irrespective of whether a reference picture of $L(1-X)$ MV of a merge candidate is in an opposite direction from a reference picture of the LX MV or not.

In some examples, there is provided an apparatus for video decoding. The apparatus includes a processor 620 and a memory 630 configured to store instructions executable by the processor; where the processor, upon execution of the instructions, is configured to perform the method as illustrated in FIG. 7.

In some examples, there is provided an apparatus for video encoding. The apparatus includes a processor 620 and a memory 630 configured to store instructions executable by the processor; where the processor, upon execution of the instructions, is configured to perform the method as illustrated in FIG. 8.

In some other examples, there is provided a non-transitory computer readable storage medium, having instructions stored therein. For example, the instructions may be stored as the predetermined software 632, or a part of the software. When the instructions are executed by a processor 620, the instructions cause the processor to perform any method as illustrated in FIGS. 7-8. In one example, the plurality of programs may be executed by the processor 620 in the computing environment 610 to receive (for example, from the video encoder 20 in FIG. 1G) a bitstream or data stream including encoded video information (for example, video blocks representing encoded video frames, and/or associated one or more syntax elements, etc.), and may also be executed by the processor 620 in the computing environment 610 to perform the decoding method described above according to the received bitstream or data stream. In another example, the plurality of programs may be executed by the processor 620 in the computing environment 610 to perform the encoding method described above to encode video information (for example, video blocks representing video frames, and/or associated one or more syntax elements, etc.) into a bitstream or data stream, and may also be executed by the processor 620 in the computing environment 610 to transmit the bitstream or data stream (for example, to the video decoder 30 in FIG. 2B). Alternatively, the non-transitory computer-readable storage medium may have stored therein a bitstream or a data stream including encoded video information (for example, video blocks representing encoded video frames, and/or associated one or more syntax elements etc.) generated by an encoder (for example, the video encoder 20 in FIG. 1G) using, for example, the encoding method described above for use by a decoder (for example, the video decoder 30 in FIG. 2B) in decoding video data. The non-transitory computer-readable storage medium may be, for example, a ROM, a Random Access Memory (RAM), a CD-ROM, a magnetic tape, a floppy disc, an optical data storage device or the like.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for video decoding, comprising:
determining, by a decoder, that an advanced motion vector prediction (AMVP)-Merge (AM) mode is enabled for a current picture or a slice of the current picture;
obtaining, by the decoder, an AMVP motion vector (MV) of a current block in the current picture, for a first list of reference pictures LX wherein X is 0 or 1, as an LX MV;
obtaining, by the decoder, a list of valid merge MV candidates for a second list of reference pictures L(1−X), wherein the list of valid merge MV candidates comprises merge candidates that have L(1−X) MV;
selecting, by the decoder, an L(1−X) MV of the AM mode among the list of valid merge MV candidates; and
determining the merge candidates that have L(1−X) MV to be valid in response to a reference picture of L(1−X) MV of a merge candidate being not in an opposite direction from a reference picture of the LX MV.

2. The method of claim 1, further comprising:
determining the merge candidates that have L(1−X) MV to be valid in response to the reference picture of L(1−X) MV of the merge candidate being in an opposite direction from the reference picture of the LX MV.

3. The method of claim 1, wherein the L(1−X) MV of the AM mode is implicitly selected as one having a minimum matching cost between an LX AMVP prediction block and an L(1−X) merge prediction block associated with each candidate among all valid merge MV candidates.

4. The method of claim 1, wherein upon determining that only one reference picture is available for the LX MV, a reference picture index is not received from a bitstream; or upon determining that more than one reference pictures are available for the LX MV, the reference picture index is signalled in the bitstream.

5. The method of claim 1, wherein upon determining that template matching functionality is enabled, template matching MV refinement is conditionally applied for the L(1−X) MV of the AM mode or the LX MV which has a higher template matching cost.

6. The method of claim 5, wherein the template matching MV refinement is applied for the L(1−X) MV of the AM mode or the LX MV which has a higher template matching cost under condition that all reference pictures have a display order before the current picture, or that at least some reference pictures have a display order after the current picture.

7. The method of claim 1, wherein no template matching MV refinement is applied for the L(1−X) MV of the AM mode or the LX MV irrespective of whether template matching functionality is enabled or not.

8. The method of claim 1, wherein the L(1−X) MV of the AM mode is implicitly selected as one having a minimum difference between the LX MV and the L(1−X) MV.

9. The method of claim 1, further comprising:
upon determining that a reference picture of the LX MV and a reference picture of the L(1−X) MV of the AM mode are different, obtaining a scaled MV for the L(1−X) MV.

10. The method of claim 9, further comprising:
obtaining the scaled MV based on a scaling ratio that is calculated based on temporal distances between the current picture and the reference pictures of the LX MV and the L(1−X) MV of the AM mode.

11. The method of claim 1, wherein the L(1−X) MV is explicitly received from a bitstream to indicate which merge candidate is selected for the AM mode.

12. The method of claim 1, wherein upon determining that at least some reference pictures have a display order after the current picture, a merge candidate that has L(1−X) MV is regarded as invalid wherein a reference picture of the L(1−X) MV of the merge candidate is in a same direction of a reference picture of the LX MV.

13. The method of claim 1, wherein upon determining that all reference pictures have a display order before the current picture, only one L(1−X) MV of the AM mode is selected as one having a minimum matching cost between an LX AMVP prediction block and an L(1−X) merge prediction block associated with each candidate among all valid merge MV candidates, and no merge MV index is received from a bitstream; and
wherein upon determining that at least some reference pictures have a display order after the current picture, a merge MV index is received from the bitstream to indicate the L(1−X) MV of the AM mode.

14. The method of claim 1, wherein upon determining that "ph_mvd_l1_zero_flag" is enabled and the AM mode is enabled for the current picture or the slice of the current picture, syntax elements indicating a regular bi-directional prediction mode are not signaled in a bitstream.

15. An apparatus for video decoding, comprising:
one or more processors; and
a memory coupled to the one or more processors and configured to store a bitstream to be decoded and instructions executable by the one or more processors, wherein the one or more processors, upon execution of the instructions, are configured to perform a method for video decoding with the bitstream, and the method comprises:
determining that an advanced motion vector prediction (AMVP)-Merge (AM) mode is enabled for a current picture or a slice of the current picture;
obtaining an AMVP motion vector (MV) of a current block in the current picture, for a first list of reference pictures LX wherein X is 0 or 1, as an LX MV;
obtaining a list of valid merge MV candidates for a second list of reference pictures L(1−X), wherein the list of valid merge MV candidates comprises merge candidates that have L(1−X) MV;
selecting an L(1−X) MV of the AM mode among the list of valid merge MV candidates; and
determining the merge candidates that have L(1−X) MV to be valid in response to a reference picture of L(1−X) MV of a merge candidate being not in an opposite direction from a reference picture of the LX MV.

16. The apparatus of claim 15, wherein the method further comprises:
determining the merge candidates that have L(1−X) MV to be valid in response to the reference picture of L(1−X) MV of the merge candidate being in an opposite direction from the reference picture of the LX MV.

17. The apparatus of claim 15, wherein the L(1–X) MV of the AM mode is implicitly selected as one having a minimum matching cost between an LX AMVP prediction block and an L(1–X) merge prediction block associated with each candidate among all valid merge MV candidates.

18. The apparatus of claim 15, wherein upon determining that only one reference picture is available for the LX MV, a reference picture index is not received from a bitstream; or upon determining that more than one reference pictures are available for the LX MV, the reference picture index is signalled in the bitstream.

19. The apparatus of claim 15, wherein upon determining that template matching functionality is enabled, template matching MV refinement is conditionally applied for the L(1–X) MV of the AM mode or the LX MV which has a higher template matching cost.

20. A non-transitory computer-readable storage medium storing a bitstream and computer-executable instructions that, when executed by one or more computer processors, cause the one or more processors to perform video decoding comprising following acts:

determining that an advanced motion vector prediction (AMVP)-Merge (AM) mode is enabled for a current picture or a slice of the current picture;

obtaining an AMVP motion vector (MV) of a current block in the current picture, for a first list of reference pictures LX wherein X is 0 or 1, as an LX MV;

obtaining a list of valid merge MV candidates for a second list of reference pictures L(1–X), wherein the list of valid merge MV candidates comprises merge candidates that have L(1–X) MV;

selecting an L(1–X) MV of the AM mode among the list of valid merge MV candidates; and determining the merge candidates that have L(1–X) MV to be valid in response to a reference picture of L(1–X) MV of a merge candidate being not in an opposite direction from a reference picture of the LX MV.

* * * * *